(12) United States Patent
Tamura et al.

(10) Patent No.: US 11,980,948 B2
(45) Date of Patent: May 14, 2024

(54) ROTARY TOOL

(71) Applicant: Koki Holdings Co., Ltd., Tokyo (JP)

(72) Inventors: kengo Tamura, Ibaraki (JP); Junichi Toukairin, Ibaraki (JP); Shota Takeuchi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 184 days.

(21) Appl. No.: 17/779,125

(22) PCT Filed: Nov. 27, 2020

(86) PCT No.: PCT/JP2020/044286
§ 371 (c)(1),
(2) Date: May 23, 2022

(87) PCT Pub. No.: WO2021/131495
PCT Pub. Date: Jul. 1, 2021

(65) Prior Publication Data
US 2022/0395911 A1    Dec. 15, 2022

(30) Foreign Application Priority Data

Dec. 26, 2019  (JP) ................................ 2019-235912

(51) Int. Cl.
*B23B 31/107*    (2006.01)
*B23B 45/02*    (2006.01)
(Continued)

(52) U.S. Cl.
CPC ............ *B23B 31/107* (2013.01); *B23B 45/02* (2013.01); *B23Q 3/12* (2013.01); *B25B 21/02* (2013.01)

(58) Field of Classification Search
CPC ......... B23B 31/107; B23B 45/02; B23Q 3/12; B25B 21/02; B25B 23/0035
(Continued)

(56) References Cited

U.S. PATENT DOCUMENTS 3,945,653 A * 3/1976 Falchle ................ B25D 17/088
 279/97
4,692,073 A * 9/1987 Martindell .............. B25B 21/00
 279/82
(Continued)

FOREIGN PATENT DOCUMENTS

CN    2868578    2/2007
CN    101691029    4/2010
(Continued)

OTHER PUBLICATIONS

"International Search Report (Form PCT/ISA/210) of PCT/JP2020/044286," dated Feb. 2, 2021, with English translation thereof, pp. 1-4.
(Continued)

*Primary Examiner* — Dariush Seif
(74) *Attorney, Agent, or Firm* — JCIPRNET (57) ABSTRACT

Provided is a rotary tool with a compact tip tool holding portion (80). The rotary tool is provided with a sleeve (81) attached to an output shaft (41) to switch a tip tool (70) between a fixed state and a detachable state. The output shaft (41) has a through hole (46) formed therein radially penetrating from the inside to the outside of a mounting hole thereof. The through hole (46) has a steel ball (85) provided therein such that at least a part of the steel ball (85) overlaps at least a part of a case (10). The sleeve (81) defines a first position in the outward direction of the steel ball (85), while the case (10) regulates a second position on the radially outer side of the first position.

14 Claims, 9 Drawing Sheets

(51) Int. Cl.
*B23Q 3/12* (2006.01)
*B25B 21/02* (2006.01)

(58) Field of Classification Search
USPC .......................................................... 173/93
See application file for complete search history.

(56) References Cited

U.S. PATENT DOCUMENTS

| | | | | |
|---|---|---|---|---|
| 6,988,734 | B2* | 1/2006 | Zierpka | B25B 23/0035 |
| | | | | 279/75 |
| 7,121,774 | B2* | 10/2006 | Hirt | B25B 15/02 |
| | | | | 279/75 |
| 8,381,830 | B2* | 2/2013 | Puzio | B25B 23/0035 |
| | | | | 173/132 |
| 2005/0173139 | A1* | 8/2005 | Furuta | B25D 16/006 |
| | | | | 173/48 |
| 2005/0284270 | A1 | 12/2005 | Huang | |
| 2006/0163824 | A1* | 7/2006 | Sasaki | B23B 31/1071 |
| | | | | 279/75 |
| 2006/0254789 | A1* | 11/2006 | Murakami | B25B 21/02 |
| | | | | 173/128 |
| 2007/0179328 | A1* | 8/2007 | Murakami | B25B 21/02 |
| | | | | 585/448 |
| 2009/0051129 | A1* | 2/2009 | Haas | B25D 17/088 |
| | | | | 279/19 |
| 2009/0223690 | A1* | 9/2009 | Sugimoto | B25B 21/026 |
| | | | | 173/48 |
| 2009/0242222 | A1* | 10/2009 | Nagasaka | B25B 21/02 |
| | | | | 173/93 |
| 2010/0186978 | A1* | 7/2010 | Sekino | B25F 5/001 |
| | | | | 173/48 |
| 2012/0279736 | A1* | 11/2012 | Tanimoto | B25B 21/026 |
| | | | | 173/117 |
| 2012/0318550 | A1* | 12/2012 | Tanimoto | B25B 23/1475 |
| | | | | 173/117 |
| 2013/0075121 | A1* | 3/2013 | Nakamura | B25B 21/02 |
| | | | | 173/94 |
| 2013/0115023 | A1* | 5/2013 | Haimer | B23B 31/107 |
| | | | | 407/30 |
| 2013/0154202 | A1* | 6/2013 | Low | B25B 23/0035 |
| | | | | 279/9.1 |
| 2013/0333910 | A1* | 12/2013 | Tanimoto | B25B 21/02 |
| | | | | 173/176 |
| 2014/0158388 | A1 | 6/2014 | Johnson | |
| 2015/0041169 | A1* | 2/2015 | Kumagai | B25D 17/26 |
| | | | | 173/93.7 |
| 2015/0144365 | A1* | 5/2015 | Hirabayashi | B25B 23/1405 |
| | | | | 173/2 |
| 2015/0151415 | A1* | 6/2015 | Saitou | B25F 5/02 |
| | | | | 173/93 |
| 2016/0008961 | A1* | 1/2016 | Takano | B25B 23/1475 |
| | | | | 173/2 |
| 2017/0259412 | A1* | 9/2017 | Nishikawa | B25B 21/026 |
| 2018/0117745 | A1 | 5/2018 | Murakami | |
| 2018/0297179 | A1* | 10/2018 | Osada | B25B 21/008 |
| 2018/0326565 | A1* | 11/2018 | Wang | B25B 23/0035 |
| 2019/0262978 | A1* | 8/2019 | Tejima | B25B 21/026 |
| 2020/0009709 | A1* | 1/2020 | Kumagai | B25B 19/00 |
| 2020/0384616 | A1* | 12/2020 | Anex | B23P 6/00 |
| 2022/0395911 | A1* | 12/2022 | Tamura | B23B 31/1071 |
| 2023/0158623 | A1* | 5/2023 | Kawai | B25B 21/026 |
| | | | | 184/6 |

FOREIGN PATENT DOCUMENTS

| | | |
|---|---|---|
| CN | 108972459 | 12/2018 |
| CN | 110382167 | 10/2019 |
| DE | 102017209160 | 12/2018 |
| JP | 2009248210 | 10/2009 |
| JP | 2013000846 | 1/2013 |
| JP | 2014151421 | 8/2014 |
| WO | 2016145930 | 9/2016 |
| WO | 2018163561 | 9/2018 |
| WO | 2019031275 | 2/2019 |

OTHER PUBLICATIONS

"Office Action of China Counterpart Application" with English translation thereof, dated Sep. 27, 2023, p. 1-p. 15.

* cited by examiner

ROTARY TOOL

CROSS-REFERENCE TO RELATED APPLICATION

This application is a 371 application of the International PCT application serial no. PCT/JP2020/044286, filed on Nov. 27, 2020, which claims the priority benefits of Japan Patent Application No. 2019-235912, filed on Dec. 26, 2019. The entirety of each of the above-mentioned patent applications is hereby incorporated by reference herein and made a part of this specification.

TECHNICAL FIELD

The invention is an improved mechanism that holds a tip tool of a rotary tool for performing, for example, screw fastening work, drilling work, etc.

RELATED ART

In terms of the conventional rotary tools, the technology of Patent Literature 1, for example, is known as a mechanism for holding a tip tool. In Patent Literature 1, an output shaft to which a tip tool is attached is provided with a small through hole that penetrates from the outer peripheral surface to a mounting hole in the radial direction, and a regulating member (steel ball) that can move in the axial direction and the radial direction of the tip tool is arranged in the through hole. A sleeve (sliding sleeve) is provided on the outer peripheral side of the steel ball to regulate or allow the movement of the steel ball in the radial direction. Here, the structure of a tip tool holding portion 180 of a conventional impact tool 101 will be described using FIG. 9.

Figure 9:
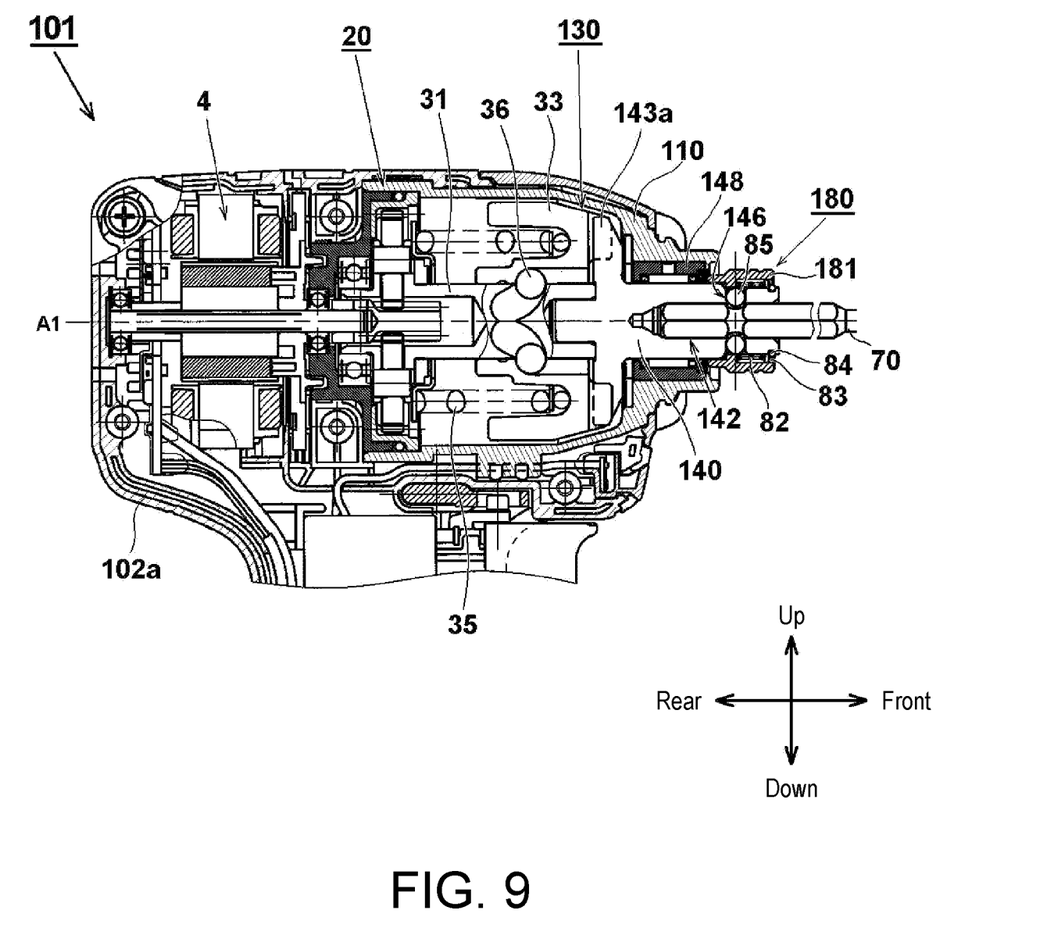
FIG. 9 is a vertical cross-sectional view showing the internal structure of the body portion 102a of the conventional impact tool 101.

FIG. 9 is a partial vertical cross-sectional view showing the internal structure of the conventional impact tool 101. A deceleration mechanism 20 using planetary gears is provided on the front side of a motor 4 to drive a striking mechanism 130. A spindle 31 and a hammer 33 constituting the striking mechanism 130 are held via steel balls 36 arranged in cam grooves, and the hammer 33 is configured to be able to retract rearward in the axial direction by a hammer spring 35 arranged at the rear end thereof. When the hammer 33 strikes, the retracted hammer 33 rotates while being pushed back forward by the hammer spring 35, and strikes an anvil 140. The anvil 140 is held in a hammer case 110 by a bearing 148. The anvil 140 is formed with a mounting hole 142 having a hexagonal cross-sectional shape that extends rearward in the axial direction from the front side end, and the tip tool holding portion 180 is provided at the tip portion of the anvil 140. Through holes 146 are formed at two locations in the circumferential direction near the tip of the anvil 140, and steel balls 85 are housed therein. A sleeve 181 is provided on the outer peripheral side of the steel balls 85. A coil spring 82 that urges the sleeve 181 to the rear side is mounted on the inner side of the sleeve 181. The coil spring 82 is held by a washer 83 held by a retaining ring 84 so as not to come off to the front side. The sleeve 181 is normally located on the rear side (position for locking the tip tool 70) when viewed in the direction of the rotation axis A1 due to the urging force of the coil spring 82. When the sleeve 181 is moved to the front side of the rotation axis A1 while countering the urging force of the coil spring 82, the steel balls 85 can be moved to the radially outer side to set the tip tool 70 to an unlocked state. Therefore, the tip tool 70 can be mounted or removed.

CITATION LIST

Patent Literature

[Patent Literature 1] Japanese Patent Laid-Open No. 2014-151421

SUMMARY OF INVENTION

Technical Problem

In recent years, rotary tools have been miniaturized in order to improve operability, and there is a demand for miniaturization of the body portion. There are approaches such as downsizing of the deceleration mechanism 20, thinning of the hammer 33, and downsizing of the anvil 140 in order to shorten the total length of the body portion. Miniaturization of the striking claw of the hammer 33 and the blade portion of the anvil 140 is not preferable because it will lead to a decrease in striking energy. Therefore, the inventors considered shortening the dimensions of the anvil 140 on the front side of the blade portion.

In view of the above background, the invention aims to provide a rotary tool that achieves miniaturization of the rotary tool. The invention also aims to provide a rotary tool having a compact tip tool holding portion without changing the number of parts and the assembly process. The invention further aims to provide a rotary tool that uses a part of a case housing a power transmission mechanism as a part of the component of the tip tool holding portion.

Solution to Problem

The following is a description of typical features of the invention disclosed in the present application. According to one feature of the invention, a rotary tool is provided, including: a drive source; a transmission mechanism driven by the drive source; a case housing the transmission mechanism; an output shaft rotated by the transmission mechanism and having a mounting hole for attaching a tip tool on an inner side of a tip side; and a sleeve attached to the output shaft and switching the tip tool between a fixed state and an open state. The output shaft has a through hole that penetrates from an inner side to an outer side of the mounting hole in a radial direction. A regulating member is provided in the through hole and is held to be movable in the radial direction to prevent the tip tool from coming off. At least a part of the regulating member overlaps at least a part of the case. In addition, the sleeve includes a first defining portion that is held on the output shaft to be movable in an axial direction and defines a first position in an outward direction of the regulating member, and the case includes a second defining portion that regulates a second position located on a radially outer side with respect to the first position of the regulating member.

According to another feature of the invention, the sleeve can be positioned in a fixed position that restricts movement of the regulating member in the radial direction by movement, and can move to a detachable position that does not restrict movement of the regulating member in the radial direction. The sleeve is urged to return to the fixed position by an urging member. In addition, when the sleeve is in the detachable position, the tip tool is allowed to be inserted into or removed from the mounting hole, and when the sleeve is in the fixed position, the tip tool is restricted from being inserted into or removed from the mounting hole by the regulating member. Further, when the sleeve is in the fixed position, the first defining portion of the sleeve and the second defining portion of the case overlap in the radial direction, and when the sleeve is in the detachable position, the first defining portion of the sleeve does not overlap the second defining portion of the case in the radial direction. The second defining portion of the case restricts movement of the regulating member in the radial direction when the sleeve is in the detachable position.

According to yet another feature of the invention, the regulating member is a steel ball, and the through hole is configured such that an opening on a radially inner side is smaller than a diameter of the steel ball and an opening on the radially outer side is larger than the diameter of the steel ball, allowing the steel ball to be inserted into the through hole from an outer side of the output shaft but preventing the steel ball from being inserted into the through hole from a mounting hole side of the output shaft. Further, a tip portion of the output shaft on which the sleeve is movably held is formed narrowly with a step on an outer peripheral surface of a cylindrical portion. The through hole is arranged in a narrowly formed portion, and the fixed position of the sleeve is defined by contacting the step. In addition, the case has a bell shape that has a through hole on a bottom surface, and the second defining portion of the case extends in a longitudinal direction of the output shaft.

According to yet another feature of the invention, a striking mechanism that uses a hammer and an anvil is provided. The anvil is integrally formed with the output shaft and includes a plurality of blade portions that extend toward the radially outer side behind the output shaft, and the mounting hole formed in the axial direction from a tip opening of the output shaft extends rearward with respect to a front end position of the blade portion. The output shaft has a step behind the mounting hole in the axial direction, and is formed such that a diameter of the step on a rear end side is large and a diameter of the step on a front end side is small. A spring and an annular member are inserted to a portion having a small diameter of the output shaft. The annular member defines a front side position of the output shaft with a retaining ring. The spring urges a contact portion of the sleeve rearward in the axial direction. When the tip tool is attached, the tip tool causes the regulating member to move rearward and toward the radially outer side against the force of the spring to allow the tip tool to be inserted into the output shaft, and the regulating member fits into the recess formed in the tip tool by the action of the spring. Further, the contact portion of the sleeve is formed in a rear end position of a cylindrical portion that houses the spring on the inner peripheral side.

Effects of Invention

In the conventional rotary tool, both the contact portion that regulates the first position of the regulating member such as a steel ball toward the radially outer side and the regulating portion that regulates the second position located on the radially outer side with respect to the first position of the regulating member are provided on the sleeve. However, according to the invention, it is not required to provide the regulating portion for regulating the second position on the sleeve. As a result, the output shaft portion can be shortened, and the case is configured to serve as a retainer for the steel ball, which eliminates the need to dispose the steel ball retaining portion provided on the conventional sleeve and can shorten the length of the sleeve in the axial direction. Therefore, it is possible to realize a rotary tool that is small and light. In addition, as the output shaft is shortened, the positions of the tip tool and the steel ball are moved rearward and brought close to the motor so it is necessary to extend the tip tool mounting hole of the tip tool holding portion to the rear. However, the fitting portion of the anvil and the spindle is composed of the rear shaft portion which is provided to extend rearward from the rear end of the anvil and the groove which is provided at the front end of the spindle and into which the rear shaft portion is inserted, which does not reduce the thickness of the rear side of the bottom portion of the tip tool mounting hole, so sufficient strength can be ensured.

DESCRIPTION OF EMBODIMENTS

Embodiment 1

Hereinafter, an embodiment of the invention will be described with reference to the drawings. The following drawings will be described using an impact tool 1 as an example of the rotary tool, and the same portions will be assigned with the same reference numerals and the repeated description will be omitted. Further, in the present specification, the front-rear, left-right, and up-down directions are described as the directions shown in the drawings.

Figure 1:
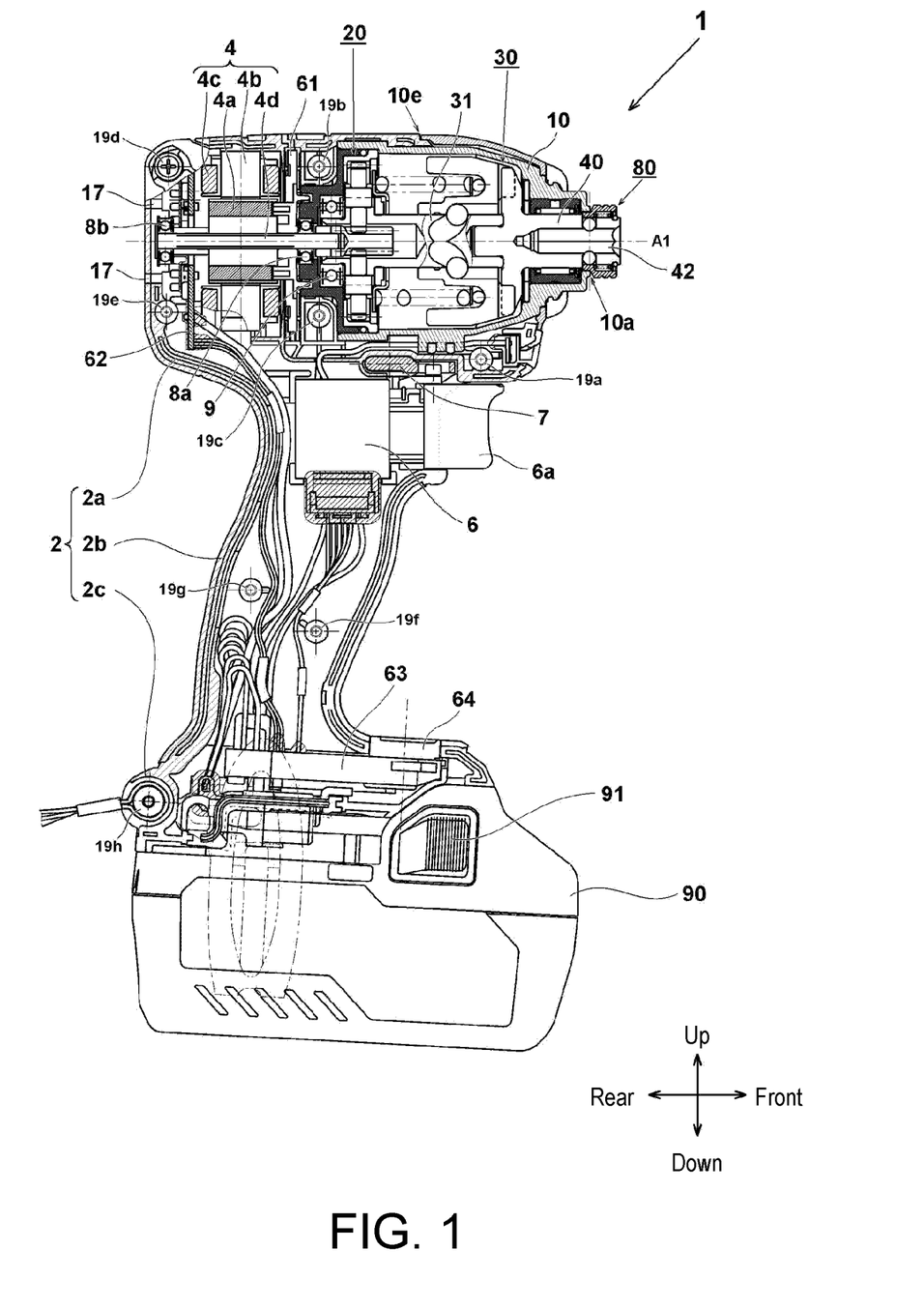
FIG. 1 is a vertical cross-sectional view showing the entire impact tool 1 according to the embodiment of the invention.

FIG. 1 is a vertical cross-sectional view showing the internal structure of the impact tool 1 according to the embodiment of the invention. The impact tool 1 uses the electric power of a rechargeable battery 90 to drive a transmission mechanism (20, 30) that uses a motor as the drive source to rotate an output shaft (40). The transmission mechanism of the impact tool 1 is composed of a deceleration mechanism 20 and a striking mechanism 30, and converts the rotational force of the motor 4 into an intermittent striking force in the rotational direction of the output shaft to rotate a tip tool mounted on the output shaft (anvil 40). The housing of the impact tool 1 is mainly composed of a main body housing 2 (2a, 2b, 2c) made of synthetic resin and a hammer case 10 made of metal for housing the striking mechanism 30. The main body housing 2 is composed of three portions, that is, a body portion 2a which is formed in a cylindrical shape, a handle portion 2b which is a portion gripped by an operator with one hand, and a battery attaching portion 2c for attaching the detachable battery 90. The handle portion 2b extends downward to be substantially orthogonal to the central axis (rotation axis A1) of the body portion 2a, and a trigger switch 6 for controlling on/off of the motor is housed at a location where the index finger is placed when the operator grips the handle portion 2b.

An operation lever (trigger lever 6a) is provided on the front side of the trigger switch 6. A forward/reverse switching lever 7 for switching the rotational direction of the motor is provided above the rear of the trigger lever 6a. The trigger switch 6 turns on the rotation of the motor 4 based on an operation of pulling the trigger lever 6a with a finger, that is, based on an operation of moving the trigger lever 6a to the rear side, and turns off the rotation of the motor 4 by releasing the pulling operation of the trigger lever 6a. In addition, the trigger switch 6 may be in any form or have any structure. Instead of the slide type trigger lever 6a, any switch mechanism such as a trigger switch having a swing type trigger lever that swings around a swing shaft or a touch button type switch may be used.

The hammer case 10 has a cup shape or a bell shape that is tapered, and the rear side of the hammer case 10 is a large circular opening 10e, and a through hole 10a through which the anvil 40 penetrates is formed in the center of the front end side which is the bottom surface. The hammer case 10 is an integral piece of metal, and is fixed by being sandwiched by the body portion 2a of the left-right split type main body housing 2. The motor 4, the deceleration mechanism 20 using planetary gears, and the striking mechanism 30 are arranged side by side on the rotation axis A1 in the cylindrical body portion 2a.

The battery attaching portion 2c is formed in the lower portion of the handle portion 2b to attach the battery 90. The battery attaching portion 2c is a diameter-expanded portion formed to expand in the radial direction (orthogonal direction) from the longitudinal central axis of the handle portion 2b. The battery 90 is a secondary battery using a lithium ion battery that is widely used in electric tools. In addition, the battery 90 may be of any type or have any shape. While a release button 91 is pressed, the battery 90 can be moved forward relative to the main body housing 2 to be removed from the main body housing 2. Further, the impact tool 1 of the present embodiment may use any power source. Instead of using the battery 90 as a power source, a commercial power source may be used via an AC power cable.

The main body housing 2 is made of synthetic resin and manufactured in a form split into left and right parts, and is fixed using a plurality of screws (only the screw 19d is shown in the figure). A plurality of screw bosses 19a to 19h for screwing are formed on one side (left side) of the main body housing 2, and a plurality of screw holes (not shown) for screws to pass through are formed on the other side (right side).

A control circuit portion 63 having a function of controlling the speed of the motor 4 based on the pulling operation of the trigger lever 6a is housed inside the battery attaching portion 2c of the main body housing 2 above the battery 90. The control circuit portion 63 has a control circuit board on which a microcomputer (hereinafter referred to as "microcomputer") (not shown) is mounted. The control circuit board of the control circuit portion 63 is arranged in a direction substantially perpendicular to the longitudinal central axis of the handle portion 2b. Further, a switch holder 64 is provided on the upper surface of the battery attaching portion 2c, and various operation buttons (not visible in the figure) such as a setting button of striking strength and a remaining power check button of the battery 90, and indicator lamps (not visible in the figure) corresponding thereto are arranged on the switch holder 64.

A brushless DC motor is used as the motor 4, and is driven by an exciting current generated by an inverter circuit. A rotation shaft 4d of the motor 4 is arranged such that the rotation axis A1 thereof extends in the longitudinal direction of the body portion 2a. The stator of the motor 4 is composed of a stator core 4b formed of a laminated iron core and formed with a plurality of magnetic pole pieces, and a coil 4c wound around each tooth of the stator core 4b. A rotor 4a generates a magnetic field by a permanent magnet housed inside the laminated iron core.

A cooling fan 61 is provided coaxially with the rotation shaft 4d on the front side of the motor 4 in the axial direction. The cooling fan 61 rotates in synchronization with the motor 4 to suck outside air from an air intake port 17 on the rear side of the main body housing 2, cool the motor 4, and then discharge it from an air discharge port (not shown) formed on the outer peripheral side of the cooling fan 61. The rotation shaft 4d of the motor 4 is pivotally supported by a bearing 8a on the front side of the stator core 4b and a bearing 8b on the rear side.

A drive circuit board 62 is arranged between the stator core 4b and the bearing 8b on the rear of the motor 4 in the axial direction. The drive circuit board 62 carries three magnetic detection means for detecting the magnetic field of the permanent magnet contained in the rotor, and an inverter circuit composed of six semiconductor switching elements such as FET (Field Effect Transistor), and is formed of an annular printed circuit board. A commercially available Hall IC can be used as the magnetic detection means, and a plurality of (for example, three) Hall ICs are mounted at predetermined intervals in positions facing the permanent magnet of the rotor.

The deceleration mechanism 20 decelerates the output of the motor 4 at a predetermined reduction ratio and transmits the output to the spindle 31. The striking mechanism 30 is provided on the output side of the deceleration mechanism 20, and the anvil 40 which is the output shaft is rotated by the striking mechanism 30. A mounting hole 42 for mounting a tip tool 70 (see FIG. 5 described later) is provided at the tip of the anvil 40, and a tip tool holding portion 80 is provided near the opening of the mounting hole 42.

Figure 2:
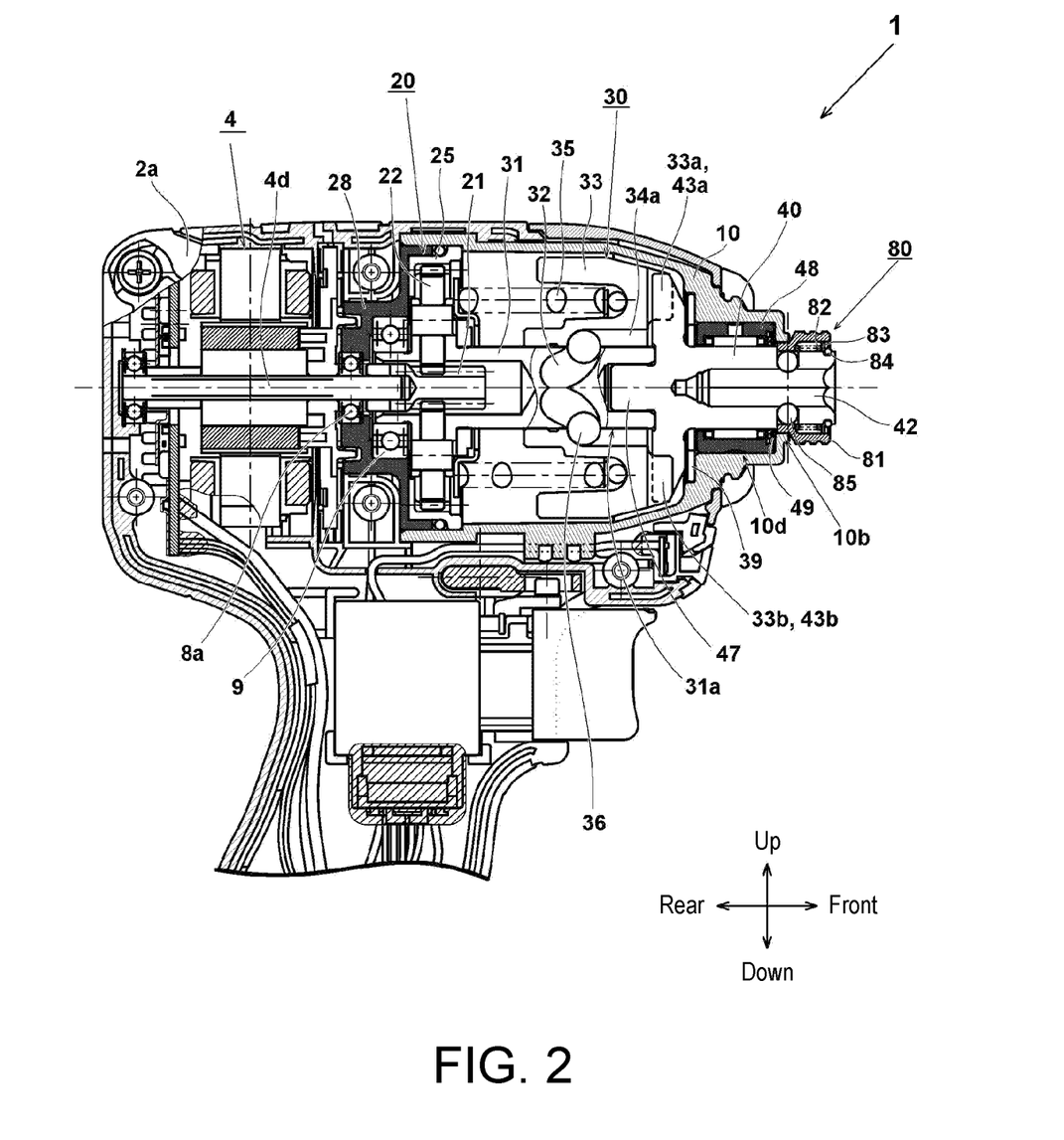
FIG. 2 is a partially enlarged view of the body portion 2a of FIG. 1.

FIG. 2 is a partially enlarged view of the body portion 2a of FIG. 1. The deceleration mechanism 20 includes a sun gear 21 fixed to the tip of the rotation shaft 4d of the motor 4, a ring gear 25 provided on the outer peripheral side of the sun gear 21 to surround the sun gear 21 at a distance, and a plurality of (for example, two) planetary gears 22 arranged in the space between the sun gear 21 and the ring gear 25. The sun gear 21 is a spur gear that serves as the input unit of the deceleration mechanism 20. The ring gear 25 is also called an outer gear, and a gear is formed on the inner peripheral surface of the ring-shaped outer cylinder portion. The outer peripheral surface of the ring gear 25 is inserted inside an inner cover 28, and the inner cover 28 is held non-rotatably with respect to the main body housing 2.

The planetary gears 22 rotate to be meshed with the outer peripheral side gear surface of the sun gear 21 and the inner peripheral side gear surface of the ring gear 25 between the outer peripheral side gear surface of the sun gear 21 and the inner peripheral side gear surface of the ring gear 25. The planetary gear 22 is pivotally supported by a disk-shaped portion at the rear end of the spindle 31, and the planetary gear 22 revolves around the sun gear 21 while rotating around the shaft 23 that pivotally supports the spindle 31. When the rotation shaft 4d of the motor 4 rotates, the sun gear 21 rotates in synchronization with the rotation, and the rotational force of the sun gear 21 is decelerated at a predetermined ratio and transmitted to the spindle 31.

The inner cover 28 is a part manufactured by integrally molding synthetic resin, and is held to be sandwiched by the body portion 2a of the main body housing 2 from the left-right direction. The inner cover 28 holds the two bearings 8a and 9 provided, and is centered such that the rotation shaft 4d of the motor 4 and the rotation center of the spindle 31 are coaxial. The bearing 8a held by the inner cover 28 is for pivotally supporting the rotation shaft 4d of the motor 4. For example, a ball bearing is used. The bearing 9 held by the inner cover 28 is for pivotally supporting the rear end of the spindle 31. For example, a ball bearing is used.

A hammer spring 35 is provided on the front side of the disk portion on the rear side of the spindle 31 and between the disk portion and the hammer 33. The hammer spring 35 urges the hammer 33 to the front side (the side of the anvil 40). A spindle cam groove 32 is formed on the outer peripheral surface of the spindle 31. The spindle 31 is manufactured by integrally molding metal considering strength.

The hammer 33 is arranged on the outer peripheral side of the shaft portion of the spindle 31, and hammer cam grooves 34a and 34b (see FIG. 3 described later), which are not shown, are formed on the inner peripheral surface. The hammer 33 is held by a cam mechanism using a steel ball 36, and the outer peripheral surface of the spindle 31 and a part of the inner peripheral surface of the hammer 33 come into contact with each other. The rotating body of the spindle 31 and the anvil 40 is pivotally supported by the inner wall of the hammer case 10 by a bearing 48 on the front side, and is supported on the hammer case 10 via the inner cover 28 by the ball type bearing 9 on the rear side. Here, a needle bearing is adopted as the bearing 48. The needle of the bearing 48 rotates to be in contact with the outer peripheral surface of a main shaft portion 41, and the outer shell of the bearing 48 is held by a bearing holding portion 10d of the hammer case 10. An oil seal 49 is attached to the front surface of the outer shell of the bearing 48 to prevent the grease filled in the hammer case 10 from leaking out from the inside of the hammer case 10.

When the reaction force received from the tip tool is low, the hammer 33 rotates in conjunction with the rotation of the spindle 31, but when the reaction force received from the tip tool becomes large, the steel ball 36 of the cam mechanism moves whereby the relative positions of the hammer 33 and the spindle 31 in the rotational direction slightly fluctuate and the hammer 33 moves largely to the rear side. Since the hammer 33 is constantly urged to the front side with respect to the spindle 31 by the hammer spring 35, the hammer 33 moves to the rear side while compressing the hammer spring 35. When the hammer 33 retracts, the contact length between the striking claw of the hammer 33 and the blade portion (struck claw) of the anvil 40 in the front-rear direction decreases, and when the contact length reaches the position of 0, the hammer 33 is disengaged from the anvil 40.

When the hammer 33 is disengaged from the anvil 40, the hammer 33 comes to engage (or collide) with the next struck claw of the anvil 40 as viewed in the rotational direction while being pushed to the front side by the compressive force of the hammer spring 35. At this time, the hammer 33 is rapidly accelerated in the rotational direction and forward by the elastic energy accumulated in the hammer spring 35 and the action of the cam mechanism in addition to the rotational force of the spindle 31, and is moved forward by the urging force of the hammer spring 35, and the striking claws 33a to 33c of the hammer 33 (see FIG. 2 for 33b and 33c) are reengaged with the blade portions 43a to 43c (see FIG. 2 for 43b and 43c) of the anvil 40 and start to rotate integrally. At this time, since a strong rotational striking force is applied to the anvil 40, the rotational striking force is transmitted to a screw via the tip tool 70 mounted in the mounting hole 42 of the anvil 40. Thereafter, the same operation is repeated, and the disengagement and engagement operations are repeated until the fastening of the target to be fastened is completed (striking operation).

The tip tool holding portion 80 includes the mounting hole 42 having a hexagonal cross-sectional shape that extends rearward in the axial direction from the front side end of the anvil 40, steel balls 85 provided at two locations in the circumferential direction, and a sleeve 81 provided on the outer peripheral side. Near the through hole 10a at the tip of the hammer case 10, the bearing holding portion 10d for holding the bearing 48 and a cylindrical inner surface 10b that regulates a movable limit position of the steel ball 85 on the radially outer side are formed. In the present embodiment, a solid needle bearing is used as the bearing 48, but the bearing 48 may be of any type. A ball bearing, a slide bearing such as metal, and other known bearings may be used. A cylindrical rear shaft portion 47 is formed at the rear end of the anvil 40, that is, on the rear side of the blade portions 43a to 43c, and the outer peripheral surface of the rear shaft portion 47 is pivotally supported by a fitting hole 31a of the spindle 31 in a slidable state.

Figure 3:
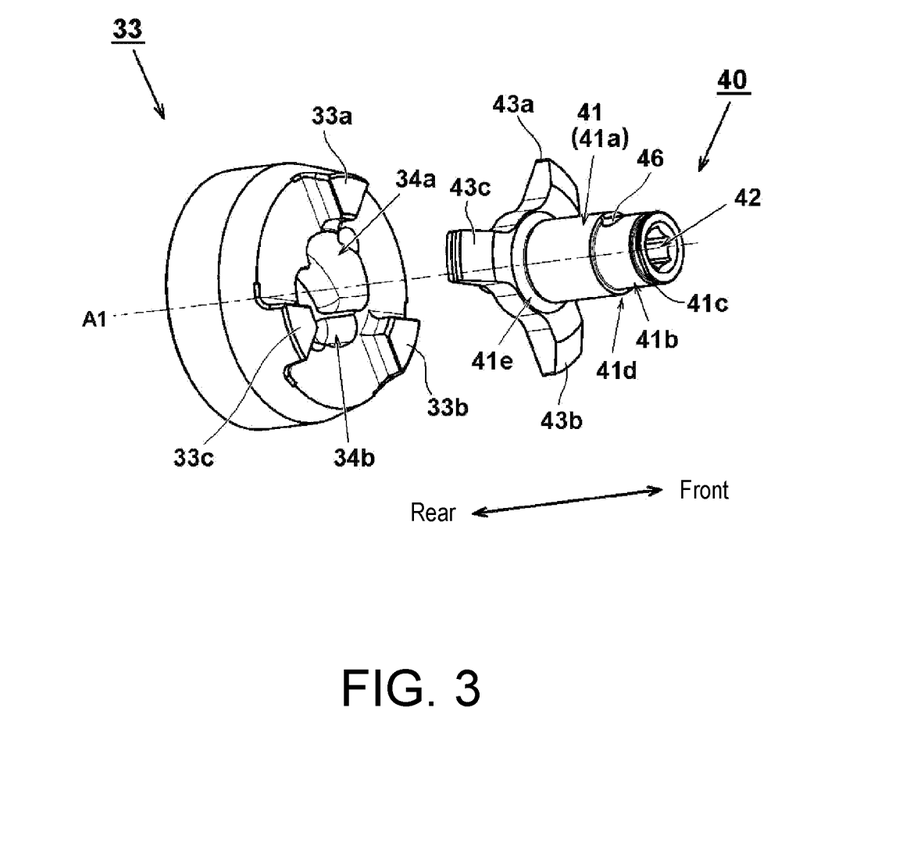
FIG. 3 is a perspective view of the hammer 33 and the anvil 40 of FIG. 1.

FIG. 3 is a perspective view of the hammer 33 and the anvil 40 of FIG. 1. In the present embodiment, the number of striking claws of the hammer 33 and the number of blade portions of the anvil 40 are set to three to smooth the transition from continuous rotation to striking and realize a high torque impact tool. The hammer 33 has a shape that two cylindrical portions having different inner diameters are connected in the radial direction on the front side. The hammer 33 is made of metal and has a relatively large weight. Three striking claws 33a to 33c protruding to the front side (the side of the anvil 40) in the axial direction are formed at three locations on the outer peripheral side of the front surface of the hammer 33. The striking claws 33a to 33c are evenly arranged in the circumferential direction such that the center positions thereof as viewed in the rotational direction are separated by 120 degrees in the rotation angle. The hammer cam grooves 34a and 34b are formed on the inner peripheral side of the hammer 33 on the portion facing the outer surface (cylindrical surface) of the spindle 31. The hammer cam grooves 34a and 34b are recesses having a substantially trapezoidal contour when the inner peripheral surface of the hammer 33 is developed into a flat surface, and together with the spindle cam groove 32, form a space that limits the movement of the steel ball 36 (see FIG. 2).

The anvil 40 is manufactured by integrally molding metal, and three blade portions 43a to 43c are formed at the rear of the cylindrical main shaft portion 41. The main shaft portion 41 is the output shaft of the rotary tool, and the mounting hole 42 having a hexagonal cross-sectional shape for mounting the tip tool is formed on the inner side portion from the front side end of the main shaft portion 41. Two through holes 46 (only one can be seen in FIG. 3) penetrating in the radial direction are formed in the middle in the front-rear direction of the portion where the mounting hole 42 is formed. The through holes 46 are formed at two locations separated by 180 degrees in the radial direction. Here, in order to shorten the front-rear length of the output shaft portion as much as possible, the length of the main shaft portion 41 in the direction of the bearing holding surface 41a is made shorter than the length of the conventional anvil 140, and accordingly, the length of the sleeve 81 in the axial direction is also formed shorter than the length of the conventional sleeve 181 shown in FIG. 9. A step portion 41d is formed between the bearing holding surface 41a and the tip tool holding portion mounting surface 41b, and the through hole 46 is arranged in a position adjacent to the step portion 41d.

The steel ball 85 (see FIG. 2), which is a component of the tip tool holding portion 80, is arranged in the through hole 46. The bearing holding surface 41a formed in a cylindrical shape is formed between the through holes 46 and the blade portions 43a to 43c as viewed in the axial direction, and the bearing holding surface 41a is a sliding surface for the bearing 48 (see FIG. 2). In this way, the front side of the anvil 40 is rotatably supported with respect to the hammer case 10 (see FIG. 2) via the bearing 48 (see FIG. 2).

The three blade portions 43a to 43c have a shape extending to the radially outer side near the rear end of the main shaft portion 41, and are formed in positions separated by 120 degrees in the circumferential direction. A reinforcing portion 41e formed in a tapered shape is provided near the boundary between the blade portions 43a to 43c and the bearing holding surface 41a to increase the strength of the anvil 40. The side surfaces of the blade portions 43a to 43c in the rotational direction are struck surfaces to be struck by the circumferential surfaces of the striking claws 33a to 33c of the hammer 33. Further, the front side portions of the blade portions 43a to 43c in the axial direction serve as the surface for contact with a washer 39.

Figure 4:
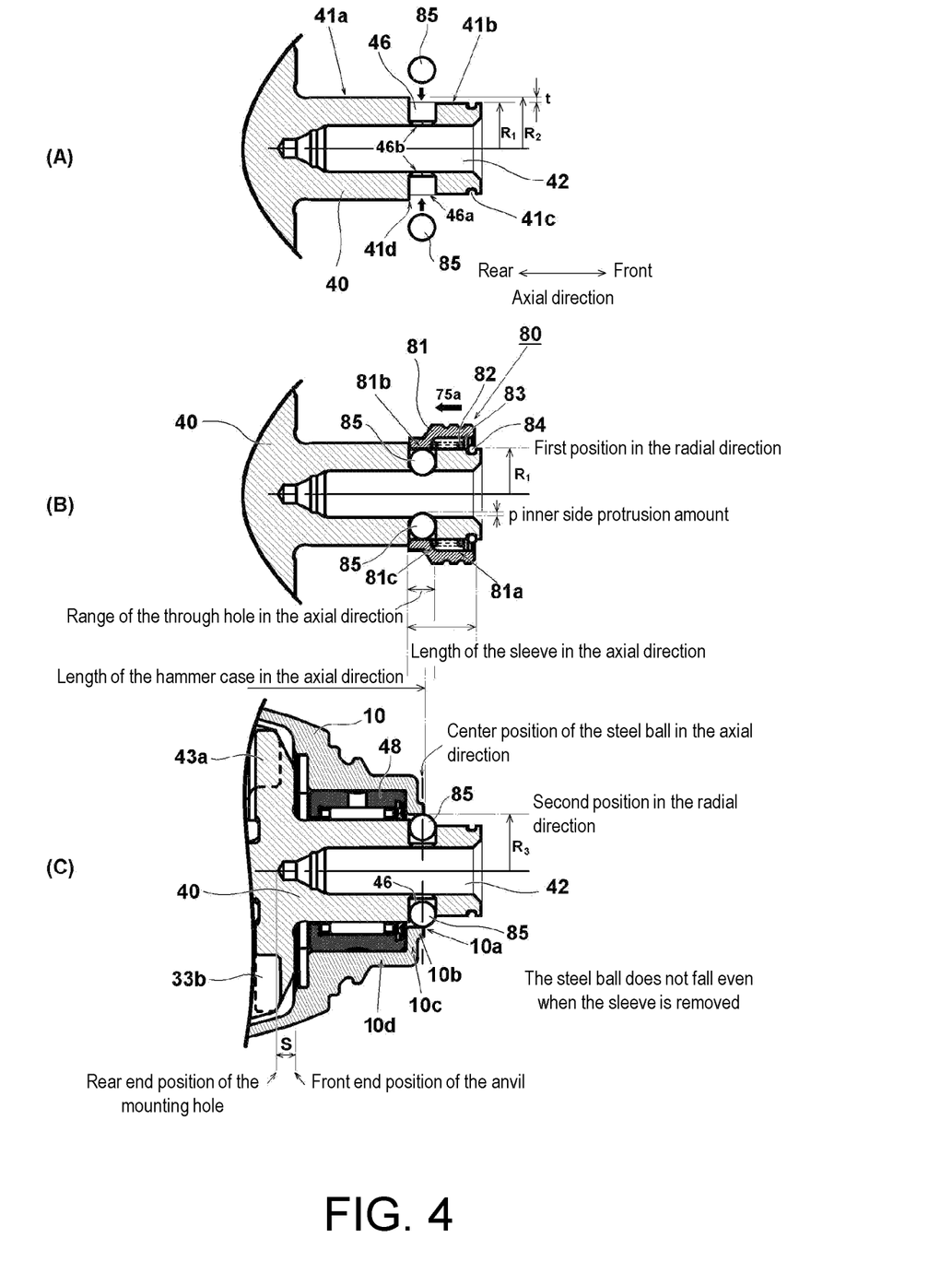
FIG. 4 contains views for illustrating the positional relationship of the steel balls 85 in the radial direction in the tip tool holding portion 80 of FIG. 1.

FIG. 4 contains views for illustrating the positional relationship of the steel balls 85 in the radial direction with respect to the main shaft portion in the tip tool holding portion 80. (A) of FIG. 4 is a partially enlarged view of the main shaft portion 41 (41a, 41b) of the anvil 40. The main shaft portion 41 (41a, 41b), which is the output shaft of the rotary tool, is formed with the mounting hole 42 that is formed from the front to the rear side in the axial direction. The mounting hole 42 has a hexagonal cross-sectional shape orthogonal to the axis. The front side of the main shaft portion 41 (41a, 41b) is the tip tool holding portion mounting surface 41b, the radius of the outer peripheral surface thereof is $R_1$, the outer peripheral surface on the rear side is the bearing holding surface 41a having a radius $R_2$, and the difference of a height t is formed in the radial direction. The connection portion between the bearing holding surface 41a and the tip tool holding portion mounting surface 41b is the step portion 41d. Two through holes 46 penetrating in the radial direction are formed near the rear end of the tip tool holding portion mounting surface 41b. The through holes 46 are respectively formed inside the mounting hole 42 to penetrate two parallel inner wall surfaces that face each other, and the circumferential positions of the through holes 46 are respectively arranged in the center of two parallel sides when viewed in the cross-sectional shape of the inner wall surfaces. The through hole 46 has a size that can house the steel ball 85, and is formed such that the steel ball 85 can easily move in the radial direction and there is a gap that allows little rattling when the steel ball 85 is in the through hole 46. The opening 46a on the outer peripheral side of the through hole 46 is slightly larger than the diameter of the steel ball 85 for inserting the steel ball 85, but the opening 46b on the inner peripheral side of the through hole 46 is slightly smaller than the diameter of the steel ball 85 so as to prevent the steel ball 85 from passing through to the inner side of the mounting hole 42. A circumferential groove 41c for holding a retaining ring 84 is formed near the front end of the tip tool holding portion mounting surface 41b.

(B) of FIG. 4 shows a state where the sleeve 81 is mounted and the tip tool holding portion 80 is assembled. The sleeve 81 is configured such that the inner diameter of a large diameter portion 81a on the front side is large enough to have a gap from the outer peripheral surface of the tip tool holding portion mounting surface 41b, and a coil spring 82 which is an urging member can be housed between the sleeve 81 and the tip tool holding portion mounting surface 41b. The rear side of the sleeve 81 is a small diameter portion 81b that has a small diameter. The inner peripheral surface of the small diameter portion 81b is set to a size that adds a gap which allows sliding to the radius $R_1$ of the outer peripheral surface of the tip tool holding portion mounting surface 41b. In other words, it can be said that the radius of the inner peripheral surface of the sleeve 81 is substantially equal to the radius $R_1$ of the outer peripheral surface of the tip tool holding portion mounting surface 41b. The sleeve 81 is urged to move in the direction of the arrow 75a by the coil type coil spring 82 interposed between a step portion 81c, which is between the large diameter portion 81a and the small diameter portion 81b, and a washer 83. The front side position of the washer 83 which is an annular member is defined by the retaining ring 84. Therefore, the normal position of the sleeve 81 is the rear position (fixed position for fixing the steel ball 85) shown in (B) of FIG. 4, and the inner side of the small diameter portion 81b is in contact with the steel ball 85 in this fixed position, thereby regulating the first position (radius $R_1$) within the movement range of the steel ball 85 in the radial direction. In other words, the inner side of the small diameter portion 81b is a first defining portion that defines the first position of the steel ball 85. The sleeve 81 is restricted from moving rearward in the axial direction by contacting the step portion 41d. When the movement of the steel ball 85 in the radial direction is restricted in the first position (radius $R_1$), the innermost peripheral portion of the steel ball 85 protrudes to the inner side by P with respect to the inner wall surface of the mounting hole 42. The protruding portions of the steel balls 85 fit into the recesses 73a and 73b of the tip tool 70 (see FIG. 5 described later) to prevent the tip tool 70 from coming off when the tip tool 70 is mounted.

(C) of FIG. 4 is a view showing the positional relationship between the hammer case 10 and the steel balls 85 before the sleeve 81 is attached. The through hole 10a on the front side of the hammer case 10 is formed sufficiently small to regulate the movement restriction position (second position) of the steel ball 85 to the radially outer side. Specifically, when the steel ball 85 moves to the radially outer side, the hammer case 10 comes into contact with the steel ball 85 in the second position and becomes a retainer, and prevents the steel ball 85 from coming out of the through hole 10a. The portion that can come into contact with the steel ball 85 has the cylindrical inner surface 10b. The front side position of the cylindrical inner surface 10b in the direction of the rotation axis A1 is formed to extend to the front side with respect to the center position of the steel ball 85 in the direction of the rotation axis A1. The outer peripheral side of the cylindrical inner surface 10b is formed with the annular wall surface 10c extending in the radial direction, and is connected to the front side end of the cylindrical bearing holding portion 10d that holds the bearing 48. In the assembly work, the anvil 40 is attached to the hammer case 10 via the bearing 48, but in the assembly work for the conventional impact tool 101 shown in FIG. 9, the steel balls 85 can be attached from outside the hammer case 110 after the bearing 48 and the anvil 140 are fixed to the hammer case 110. However, in the present embodiment, since a part of the hammer case 10 (cylindrical inner surface 10b) is used as the second defining portion for restricting the amount of movement of the steel ball 85 to the radially outer side, the anvil 40 is attached to the hammer case 10 in a state where two steel balls 85 are housed in the through holes 46 of the anvil 40 in advance. According to this assembly procedure, because of the relationship that the cylindrical inner surface 10b of the hammer case 10 overlaps the through hole 46 and the steel ball 85 in the axial direction, the steel ball 85 cannot be removed to the outside in the state of (B) of FIG. 4. In other words, after the anvil 40 is pivotally supported by the hammer case 10, the steel ball 85 cannot be mounted in the through hole 46 from the outside.

As an assembly procedure, the anvil 40 is assembled in the hammer case 10 as shown in (C) of FIG. 4 after the state shown in (A) of FIG. 4, and then the sleeve 81 is attached as shown in (B) of FIG. 4. The method of assembling the sleeve 81 after mounting the steel ball 85 may be the same as the conventional impact tool 101.

Figure 5:
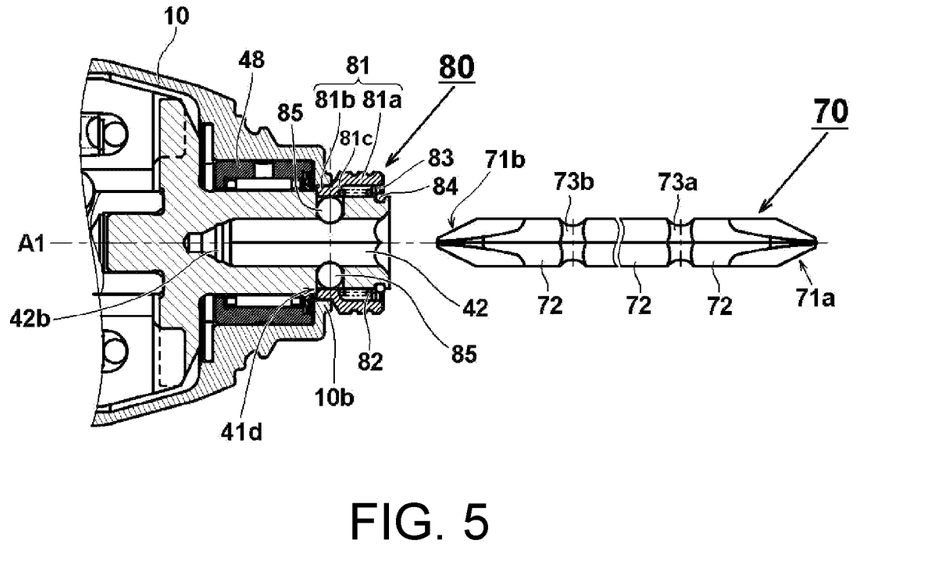
FIG. 5 is a view illustrating the structure and movement of the tip tool holding portion 80 of FIG. 1 (No. 1).

Next, the structure of the tip tool holding portion 80 and the movement thereof will be described with reference to FIG. 5 to FIG. 8. FIG. 5 shows a state where the sleeve 81 of the tip tool holding portion 80 is not operated, and the sleeve is in the fixed position. In this normal state, the sleeve 81 is urged to the rear side with the retaining ring 84 as a fulcrum by the action of the coil spring 82, and the rear end surface of the sleeve 81 is in contact with the step portion 41d. Further, since the inner side of the small diameter portion 81b of the sleeve 81 contacts the steel ball 85, a part of the steel ball 85 protrudes into the mounting hole 42.

The tip tool 70 has a plus or minus shape formed on both ends respectively, and this bit is commercially available as a standard product. The cross-sectional shape of the main shaft portion 72 of the tip tool 70 is a regular hexagon, and the cross-sectional shape of the mounting hole 42 of the impact tool 1 is also formed into a regular hexagon in accordance with the tip tool 70. The tip portions 71a and 71b at both ends of the tip tool 70 have the same or different sizes or shapes. When fastening work is performed using the tip portion 71a of the tip tool 70, the side of the tip portion 71b is inserted into the mounting hole 42, and when fastening work is performed using the tip portion 71b, the side of the tip portion 71a is inserted into the mounting hole 42. The recesses 73a and 73b that each has a semicircular cross-sectional shape and is continuous in the circumferential direction are formed in predetermined positions in the axial direction of the main shaft portion 72 of the tip tool 70.

Figure 6:
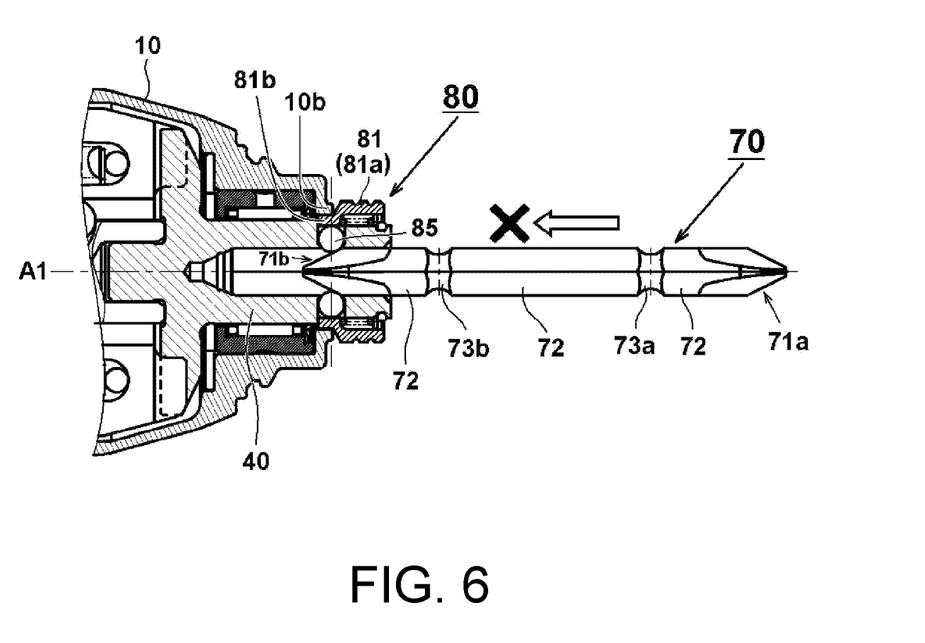
FIG. 6 is a view illustrating the structure and movement of the tip tool holding portion 80 of FIG. 1 (No. 2).

FIG. 6 is a cross-sectional view showing a state where the tip tool 70 is inserted rearward in the axial direction without the operator operating the sleeve 81. In this state, the inclined surface of the tip portion 71b, formed in a tapered shape, of the tip tool 70 contacts the inner side protruding portion of the steel ball 85, which prevents the tip tool 70 from moving further rearward. In other words, the tip tool 70 cannot be mounted unless the operator operates the sleeve 81.

Figure 7:
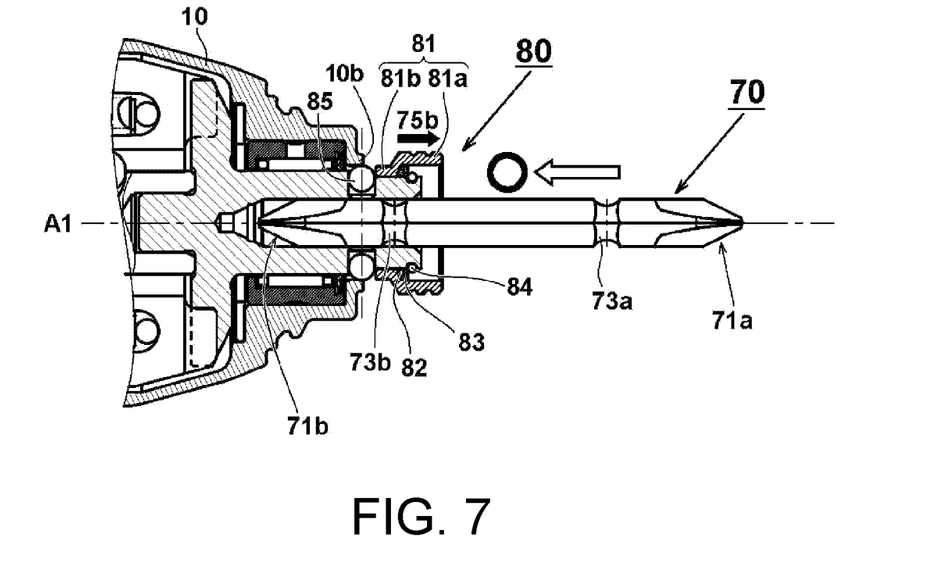
FIG. 7 is a view illustrating the structure and movement of the tip tool holding portion 80 of FIG. 1 (No. 3).

FIG. 7 is a cross-sectional view showing a state where the tip tool 70 is being inserted rearward in the axial direction while the operator moves the sleeve 81 in the direction of the arrow 75b. When the sleeve 81 is moved to the front side as shown by the arrow 75b, the position of the small diameter portion 81b of the sleeve 81 shifts from the radially outer side of the steel ball 85 to the front side, and therefore the contact state between the sleeve 81 and the steel ball 85 is released. This is a state where the tip tool 70 is switched to a detachable state by the sleeve 81. The steel ball 85 is guided by the tip portion 71b of the tip tool 70 formed diagonally and moves to the radially outer side. Since this movement causes the amount of protrusion of the steel ball 85 into the mounting hole 42 to become zero, the insertion of the tip tool 70 into the mounting hole 42 is not hindered, and therefore the operator can insert the tip tool 70 to a defined position. Since the maximum amount of movement in the radial direction of the steel ball 85 that moves to the radially outer side is limited in the second position by the cylindrical inner surface 10b formed on the hammer case 10, the steel ball 85 does not come off from the anvil 40.

Figure 10:
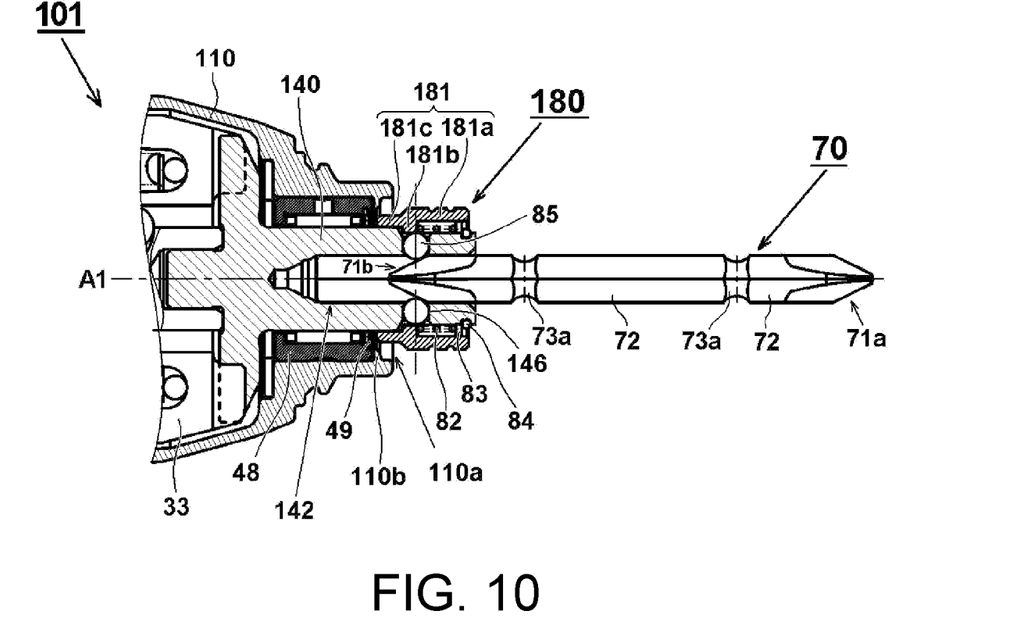
FIG. 10 is a view illustrating the structure and movement of the tip tool holding portion 180 of the conventional impact tool 101 (No. 1).

Here, for comparison, the configuration of the tip tool holding portion 180 of the conventional impact tool 101 will be described with reference to FIG. 10 to FIG. 12. FIG. 10 is a view for illustrating the structure and movement of the tip tool holding portion 180 of the conventional impact tool 101, and shows a case where the sleeve 181 is in the fixed position that defines the first position of the steel ball 85 in the outward direction. The tip tool holding portion 180 is attached to the tip of the anvil 140. To attach the tip tool holding portion 180, the anvil 140 is formed with a slightly smaller diameter at the tip of the main shaft portion. Two through holes 146 penetrating in the radial direction are formed in the narrowly formed portion, and the steel balls 85 are arranged from the radially outer side. After the two steel balls 85 are held in the through holes 146, the sleeve 181 is mounted on the outer side such that the steel balls 85 are held without falling out to the radially outer side. The sleeve 181 is formed with a large diameter portion 181a, a small diameter portion 181c, and an inner side protruding portion 181b having a reduced inner diameter at the connection portion between the large diameter portion 181a and the small diameter portion 181c. When the sleeve 181 is in the normal position (fixed position) shown in FIG. 10, the inner side protruding portion 181b for preventing the steel ball 85 from moving to the radially outer side is in a position facing the steel ball 85. On the inner side of the large diameter portion 181a of the sleeve 181, a compression type coil spring 82 is arranged between the inner side of the large diameter portion 181a and the tip tool holding portion mounting surface 41b, and the coil spring 82 is compressed to the rear side by the washer 83 from the front side and fixed by the retaining ring 84. In this way, the sleeve 181 is urged to the rear side by the coil spring 82 and fixed.

Figure 11:
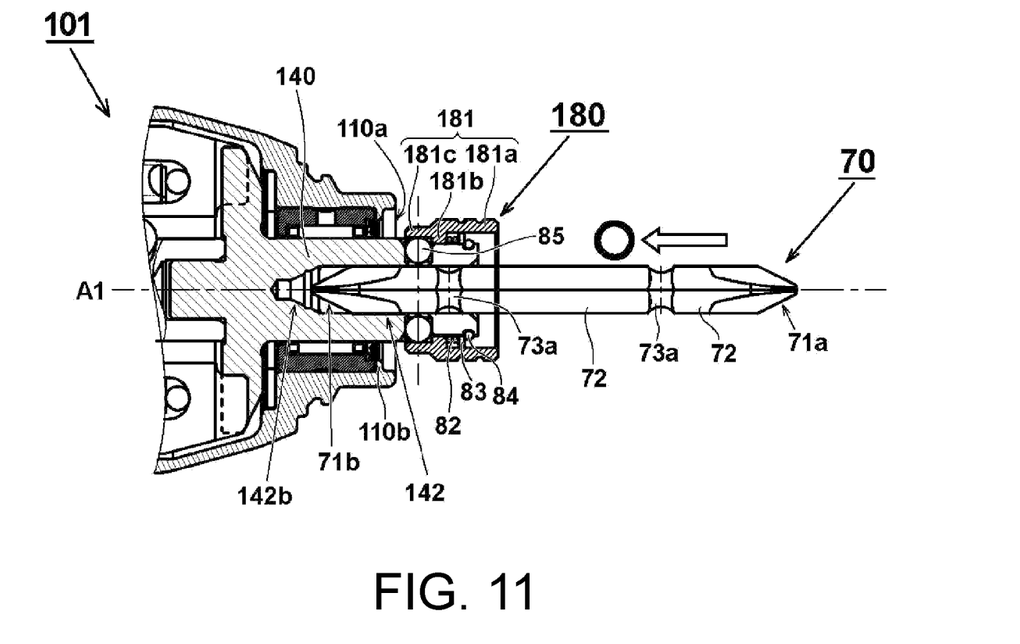
FIG. 11 is a view illustrating the structure and movement of the tip tool holding portion 180 of the conventional impact tool 101 (No. 2).

FIG. 11 shows a state where the sleeve 181 is moved to the front side in the direction of the rotation axis A1 from the state of FIG. 10. In this state, since the inner side protruding portion 181b moves to the front side with respect to the steel ball 85, the small diameter portion 181c is located on the outer peripheral surface of the steel ball 85. In this state, the steel ball 85 can move to the radially outer side from the state of FIG. 10 (the state where the first movement position in the outward direction is defined), and move to the second position which is located on the radially outer side of the first position. By moving (retracting) the steel ball 85 to the radially outer side, the tip tool 70 can be inserted into the mounting hole 142 of the anvil 140.

Figure 12:
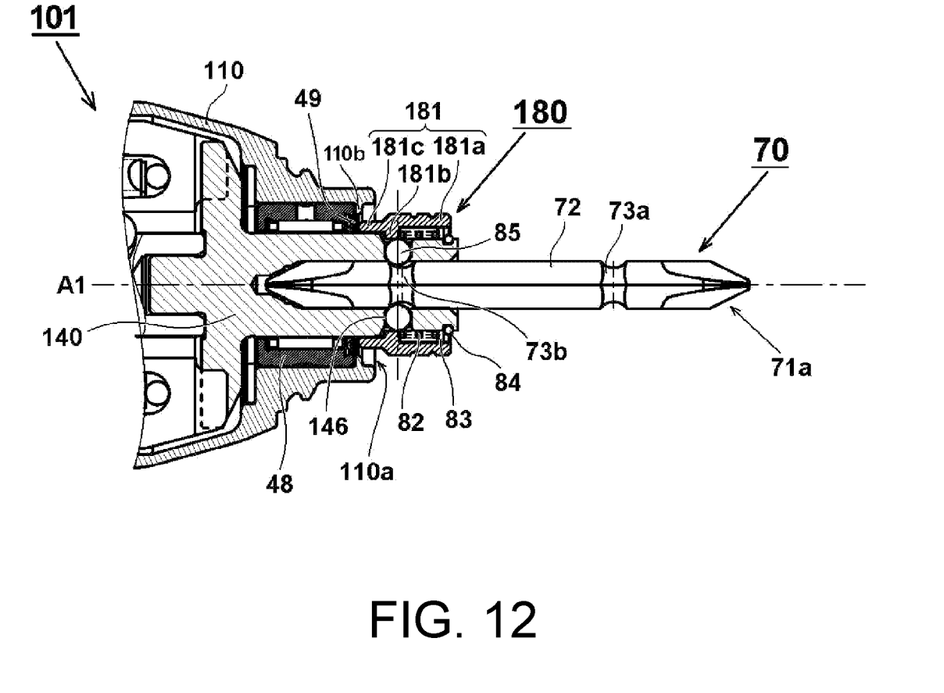
FIG. 12 is a view illustrating the structure and movement of the tip tool holding portion 180 of the conventional impact tool 101 (No. 3).

FIG. 12 shows a state where the sleeve 181 is released from movement to the front side after the tip tool 70 is inserted into the mounting hole 142 of the anvil 140 to a defined position. In this state, the restoring force of the coil spring 82 causes the sleeve 181 to return to the same normal position (fixed position) as in FIG. 10. At this time, since the inner side protruding portion 181b of the sleeve 181 faces the steel ball 85, the steel ball 85 protrudes to the inner side of the mounting hole 142. At this time, since the recess 73b of the tip tool 70 is located on the inner side of the steel ball 85, the tip tool 70 can be locked so as not to move in the direction of the rotation axis A1.

As described above, in the conventional impact tool 101, the first position and the second position of the steel ball 85 are defined by the sleeve 181 alone, and the hammer case 110 has a configuration that does not act on the steel ball 85 at all. On the other hand, in the present embodiment, as shown in FIG. 7, the second position located on the radially outer side of the first position of the steel ball 85 is defined by the cylindrical inner surface 10b of the hammer case 10. Therefore, the portion corresponding to the small diameter portion 181c shown in FIG. 10 of the conventional sleeve 181 can be omitted, and the total length of the sleeve 81 can be shortened.

Figure 8:
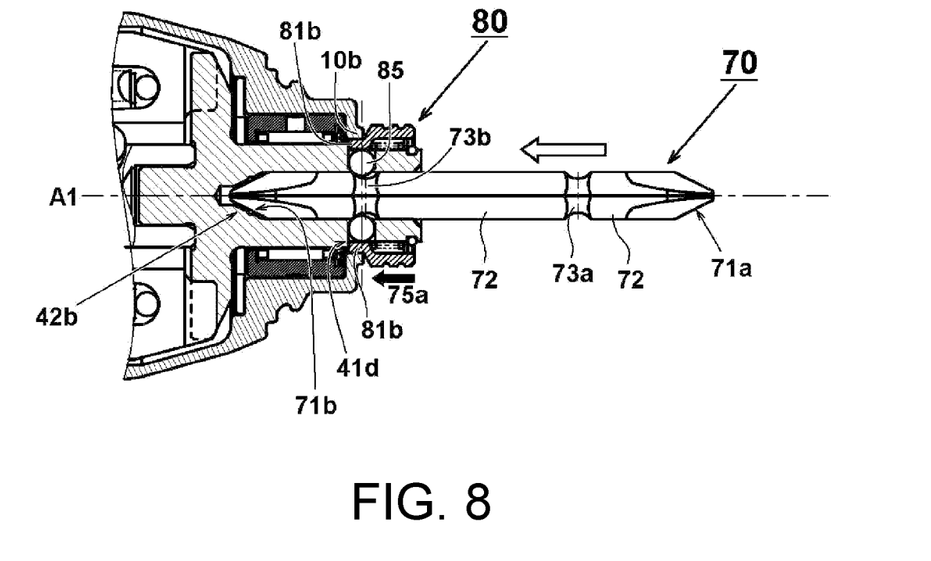
FIG. 8 is a view illustrating the structure and movement of the tip tool holding portion 80 of FIG. 1 (No. 4).

FIG. 8 shows a state after the operator releases the sleeve 81 from movement to the front side after the tip tool 70 is inserted to hit the rear in the axial direction from the state of FIG. 7 (fixed state of the tip tool 70). When the operator releases the sleeve 81 from movement to the front detachable position, the sleeve 81, which has moved to the detachable position against the urging force of the coil spring 82, returns to the original position (fixed position) as shown by the arrow 75a due to the restoring force of the coil spring 82. At that time, because the rear end of the sleeve 81 moves while contacting the circumferential surface of the steel ball 85, the steel ball 85 is moved to the radially inner side. In the position of the tip tool 70 in FIG. 8, the recess 73b is on the inner side of the steel ball 85 during the movement. Therefore, the steel ball 85 is maintained in the state of protruding into the mounting hole 42, and the protruding portion is maintained in the state of being housed in the recess 73b. When the steel ball 85 moves to the innermost peripheral side of the mounting hole 42, the sleeve 81 is not restricted from moving to the rear side by the steel ball 85, and therefore the sleeve 81 is moved by the restoring force of the coil spring 82 to come into contact with the step portion 41d and stays at the normal position (fixed position) that fixes the steel ball 85. Since the steel ball 85 cannot move to the radially outer side in the fixed position of the sleeve 81, the fitting between the steel ball 85 and the recess 73b prevents the tip tool 70 from moving even if the operator tries to pull out only the tip tool 70. In the state of FIG. 8, the motor 4 is rotated by pulling the trigger of the impact tool 1.

To remove the tip tool 70, the operator moves the sleeve 81 forward in the axial direction (the direction of the arrow 75b in FIG. 7). Then, the coil spring 82 is compressed and the tip tool holding portion 80 is in the same state as in FIG. 7. By moving the sleeve 81 forward, the position of the small diameter portion 81b shifts forward, and therefore the state of holding on the radially outer side of the steel ball 85 is released. When the operator moves (pulls) the tip tool 70 forward in that state, the steel ball 85 is guided by the inclined surface of the recess 73b and moves to the radially outer side, and finally the steel ball 85 is located on the outer side with respect to the inner wall of the tip tool 70 (the state of FIG. 7). Since the movement of the tip tool 70 is not restricted in this state, the operator can easily pull out the tip tool 70. FIG. 7 shows a state where the steel ball 85 is on the outer side with respect to the outer surface of the tip tool and is in the radially outermost position (second position) in contact with the cylindrical inner surface 10b to facilitate understanding. Actually it is possible to attach and detach the tip tool 70 if the steel ball 85 can be retracted to the radially outer side to an extent that it does not contact the outer surface of the tip tool 70.

After pulling out the tip tool 70, if the operator stops pulling the sleeve 81, the restoring force of the coil spring 82 causes the sleeve 81 to return to the original position, that is, the state shown in FIG. 5. As described above, in the present embodiment, by moving the sleeve 81 in the direction away from the main body side, the steel ball 85 can be separated from the small diameter portion 81b of the sleeve 81 and move to the radially outer side. Accordingly, the tip tool 70 is released from the state of being engaged with the recess 73b, and the tip tool 70 can be attached and detached. This operation procedure is the same as that for the tip tool holding portion 180 of the conventional impact tool 1.

According to the present embodiment, the sleeve 81 defines the first position of the regulating member (steel ball, etc.) in the tip tool holding portion 80 toward the radially outer side, and the regulating portion for regulating the second position on the radially outer side with respect to the first position is provided on the side of the hammer case 10. Therefore, the length of the sleeve 81 in the axial direction can be shortened. As a result, the total length of the anvil, which is the output shaft, can be shortened to make the rotary tool smaller and lighter. In addition, by making the rotary tool smaller and lighter, the handleability of the rotary tool can be improved.

Although the invention has been described above based on the embodiment, the invention is not limited to the above-described embodiment, and various modifications can be made without departing from the spirit of the invention. For example, although the above-described embodiment illustrates that the impact tool 1 is an example of the rotary tool, the invention can be applied to a rotary tool other than the impact tool 1, such as a driver drill, if it has a mounting hole in a hexagonal cross-sectional shape at the tip of the output shaft for mounting a bit having a hexagonal cross-sectional shape. In addition, the sleeve of the tip tool holding portion is not necessarily operated in the axial direction, and the configuration of the invention can be realized even if the sleeve is rotated around the rotation axis A1 to switch between defining the first position in the radial direction of the steel ball and not restricting the regulated movement position, and to regulate the second position with the hammer case when the sleeve does not restrict the movement position.

What is claimed is:

1. A rotary tool, comprising:
  a drive source;
  a transmission mechanism driven by the drive source;
  a case housing the transmission mechanism;
  an output shaft rotated by the transmission mechanism and having a mounting hole for attaching a tip tool on an inner side of a tip side; and
  a sleeve attached to the output shaft and switching the tip tool between a fixed state and a detachable state,
  wherein the output shaft has a through hole that penetrates from an inner side to an outer side of the mounting hole in a radial direction,
  a regulating member is provided in the through hole and is held to be movable in the radial direction to prevent the tip tool from coming off, and a center of the regulating member overlaps at least a part of the case, wherein the sleeve comprises a first defining portion that is held on the output shaft to be movable in an axial direction and defines a first position in an outward direction of the regulating member, and the case comprises a second defining portion that regulates a second position located on a radially outer side with respect to the first position of the regulating member.

2. The rotary tool according to claim 1, wherein the second defining portion serves as a retainer that prevents the regulating member from coming out of the through hole.

3. The rotary tool according to claim 2, wherein the second defining portion is capable of contacting the regulating member.

4. The rotary tool according to claim 1, wherein the sleeve is movable between a fixed position that restricts movement of the regulating member in the radial direction and a detachable position that does not restrict movement of the regulating member in the radial direction, and the sleeve is urged to return to the fixed position by an urging member.

5. The rotary tool according to claim 4, wherein when the sleeve is in the detachable position, the tip tool is allowed to be inserted into or removed from the mounting hole, and when the sleeve is in the fixed position, the tip tool is restricted from being inserted into or removed from the mounting hole by the regulating member.

6. The rotary tool according to claim 5, wherein when the sleeve is in the fixed position, the first defining portion of the sleeve and the regulating member overlap in the radial direction, and when the sleeve is in the detachable position, the first defining portion of the sleeve and the regulating member do not overlap in the radial direction.

7. The rotary tool according to claim 6, wherein the second defining portion of the case restricts movement of the regulating member toward the radial direction when the sleeve is in the detachable position.

8. The rotary tool according to claim 4, wherein a tip portion of the output shaft on which the sleeve is movably held is formed narrowly with a step on an outer peripheral surface of a cylindrical portion, the through hole is arranged in a narrowly formed portion, and the fixed position of the sleeve is defined by contacting the step.

9. The rotary tool according to claim 1, wherein the regulating member is a steel ball, the through hole is configured such that an opening on a radially inner side is smaller than a diameter of the steel ball and an opening on the radially outer side is larger than the diameter of the steel ball, allowing the steel ball to be inserted into the through hole from an outer side of the output shaft but preventing the steel ball from being inserted into the through hole from a mounting hole side of the output shaft.

10. The rotary tool according to claim 1, wherein the case has a bell shape that has a through hole on a bottom surface, and the second defining portion of the case extends in a longitudinal direction of the output shaft.

11. The rotary tool according to claim 1, comprising a striking mechanism that uses a hammer and an anvil, wherein the anvil is integrally formed with the output shaft and comprises a plurality of blade portions that extend toward the radially outer side behind the output shaft, and the mounting hole formed in the axial direction from a tip opening of the output shaft extends rearward with respect to a front end position of the blade portion.

12. The rotary tool according to claim 1, wherein the output shaft has a step behind the mounting hole in the axial direction, and is formed such that a diameter of the step on a rear end side is large and a diameter of the step on a front end side is small, a spring and an annular member are inserted to a portion having a small diameter of the output shaft, the annular member defines a front side position of the output shaft with a retaining ring, the spring urges a contact portion of the sleeve rearward in the axial direction, when the tip tool is attached, an operation is performed to move the sleeve forward against a force of the spring so as to set the tip tool to the detachable state, and the tip tool is allowed to be inserted into the output shaft, and when the operation is released, the sleeve is moved rearward by action of the spring, and the regulating member fits into a recess formed in the tip tool so as to set the tip tool to the fixed state.

13. The rotary tool according to claim 12, wherein the contact portion of the sleeve is formed in a rear end position of a cylindrical portion that houses the spring on an inner peripheral side.

14. The rotary tool according to claim 1, wherein the drive source is driven by electric power from a battery.

* * * * *